US011964693B2

(12) United States Patent
Salter et al.

(10) Patent No.: US 11,964,693 B2
(45) Date of Patent: Apr. 23, 2024

(54) VEHICLE HAVING PARK ASSIST AND METHOD

(71) Applicant: Ford Global Technologies, LLC, Dearborn, MI (US)

(72) Inventors: Stuart C. Salter, White Lake, MI (US); Kristopher Karl Brown, Dearborn, MI (US); John Robert Van Wiemeersch, Novi, MI (US); Hussein H. Berry, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 384 days.

(21) Appl. No.: 17/374,107

(22) Filed: Jul. 13, 2021

(65) Prior Publication Data

US 2023/0016676 A1    Jan. 19, 2023

(51) Int. Cl.
| | | |
|---|---|---|
| *G08G 1/14* | (2006.01) | |
| *B60Q 9/00* | (2006.01) | |
| *B62D 15/02* | (2006.01) | |
| *E05F 15/40* | (2015.01) | |

(Continued)

(52) U.S. Cl.
CPC .......... *B62D 15/027* (2013.01); *B60Q 9/006* (2013.01); *E05F 15/40* (2015.01); *B60W 30/06* (2013.01); *B60W 2556/65* (2020.02); *B62D 15/028* (2013.01); *E05F 15/60* (2015.01); *E05Y 2201/434* (2013.01); *E05Y 2400/54* (2013.01); *E05Y 2900/531* (2013.01)

(58) Field of Classification Search
CPC . E05F 15/76; E05F 15/40; E05F 15/60; E05F 2015/763; G08G 1/162; G08G 1/166; G08G 1/168; B62D 15/027; B62D 15/028; B60Q 9/006; E05Y 2201/434; E05Y 2400/54; E05Y 2900/531; B60W 30/06; B60W 2556/65

See application file for complete search history.

(56) References Cited

U.S. PATENT DOCUMENTS

| | | | |
|---|---|---|---|
| 8,493,236 B2 | 7/2013 | Boehme et al. | |
| 9,102,330 B2 * | 8/2015 | Beaurepaire | B60W 30/06 |
| 9,443,430 B2 * | 9/2016 | Beaurepaire | G08G 1/162 |

(Continued)

FOREIGN PATENT DOCUMENTS

| | | |
|---|---|---|
| DE | 102012201038 A1 | 7/2013 |
| DE | 102008036009 B4 | 3/2018 |

*Primary Examiner* — Gonzalo Laguarda
(74) *Attorney, Agent, or Firm* — Frank Lollo; Price Heneveld LLP (57) ABSTRACT

A vehicle having park assist includes a plurality of powered closure doors, each door having an actuator for moving the door between closed and open positions, a plurality of sensors located on the vehicle for sensing objects relative to the vehicle and generating sensed signals indicative of the sensed objects, and a transceiver for communicating with a parked vehicle. The vehicle also includes a controller processing the sensed signals, determining a distance and location of the sensed objects relative to the doors, and determining a parking location for the vehicle in a garage where the closure doors are free from contact with an object in the garage when in an open position and are free of contact with powered closure doors on the parked vehicle. An output is provided to assist a driver of the vehicle to park the vehicle in the garage in the determined parking location.

20 Claims, 11 Drawing Sheets

(51) Int. Cl.
 *B60W 30/06* (2006.01)
 *E05F 15/60* (2015.01)

(56) References Cited

U.S. PATENT DOCUMENTS

| | | | |
|---|---|---|---|
| 9,676,256 B2 * | 6/2017 | Elie | E05F 15/614 |
| 9,816,308 B2 * | 11/2017 | Myers | E05F 15/73 |
| 10,286,904 B2 * | 5/2019 | Yaldo | G08G 1/143 |
| 2017/0030118 A1 * | 2/2017 | Elie | E05B 81/66 |
| 2017/0169712 A1 * | 6/2017 | Penilla | B60W 30/06 |
| 2020/0394915 A1 * | 12/2020 | Salles | B60W 10/10 |
| 2021/0223391 A1 * | 7/2021 | Drysch | G08G 1/0129 |
| 2022/0195783 A1 * | 6/2022 | Park | E05F 15/70 |
| 2023/0077123 A1 * | 3/2023 | Salter | G06V 40/172 |

\* cited by examiner

VEHICLE HAVING PARK ASSIST AND METHOD

FIELD OF THE DISCLOSURE

The present disclosure generally relates to assisted parking of a vehicle, and more particularly relates to a system and method of assisting with the parking of a vehicle having powered doors.

BACKGROUND OF THE DISCLOSURE

Motor vehicles are commonly equipped with various closure doors to allow ingress and egress of the vehicle passenger and storage compartments. The closure doors may be powered with electric motors which operate to open and close the doors. It would be desirable to provide for parking assist to assist a driver to park a vehicle in a manner that does not interfere with the movement of the powered doors or access to the door opening.

SUMMARY OF THE DISCLOSURE

According to a first aspect of the present disclosure, a vehicle having park assist is provided. The vehicle includes a plurality of powered closure doors, each door having an actuator for moving the door between closed and open positions, a plurality of sensors located on the vehicle for sensing objects relative to the vehicle and generating sensed signals indicative of the sensed objects, and a transceiver for communicating with a parked vehicle. The vehicle also includes a controller processing the sensed signals generated by the plurality of sensors, determining a distance and location of the sensed objects relative to the plurality of powered closure doors, and determining a parking location for the vehicle, wherein the parking location is determined such that the at least some of the plurality of powered closure doors are free from contact with an object when the at least some of the closure doors are in an open position, and wherein the controller determines the parking location to be free of contact with powered closure doors on the parked vehicle, and an output for providing an output to assist a driver of the vehicle to park the vehicle in the determined parking location.

Embodiments of the first aspect of the disclosure can include any one or a combination of the following features:
  the vehicle communicates with the parked vehicle via the transceiver to acquire powered door closure data for the parked vehicle;
  the parking location is in a garage;
  the vehicle determines the location of features in the garage by processing the sensed signals of the plurality of sensors, and wherein the controller determines the parking location in the garage further based on the location of the sensed features of the garage;
  the sensed features include walls defining an open space of the garage;
  the plurality of sensors comprises at least one of an ultrasonic sensor, a radar sensor and an imaging camera;
  the controller further determines a location of a user of the vehicle and actuates at least one of the powered closure doors to the open position when the user approaches the vehicle;
  the actuator comprises an electric motor;
  at least some of the powered closure doors comprise passenger doors that pivot about a hinge assembly; and
  at least some of the powered closure doors comprises a tailgate.

According to a second aspect of the present disclosure, a vehicle having park assist is provided. The vehicle includes a plurality of powered closure doors, each door having an actuator for moving the door between closed and open positions, a plurality of sensors located on the vehicle for sensing objects relative to the vehicle and generating sensed signals indicative of the sensed objects, and a transceiver for communicating with a parked vehicle. The vehicle also includes a controller processing the sensed signals generated by the plurality of sensors, determining a distance and location of the sensed objects relative to the plurality of powered closure doors, and determining a parking location for the vehicle in a garage, wherein the parking location is determined such that the at least some of the plurality of powered closure doors are free from contact with an object in the garage when the at least some of the powered closure doors are in an open position, and wherein the controller determines the parking location to be free of contact with powered closure doors on the parked vehicle, and an output for providing an output to assist a driver of the vehicle to park the vehicle in the garage in the determined parking location, wherein the vehicle communicates with the parked vehicle via the transceiver to acquire powered door closure data for the parked vehicle.

Embodiments of the second aspect of the disclosure can include any one or a combination of the following features:
  the vehicle determines the location of features in the garage by processing the sensed signals of the plurality of sensors, and wherein the controller determines the parking location further based on the location of the sensed features of the garage;
  the sensed features include walls defining an open space of the garage;
  the plurality of sensors comprises at least one of an ultrasonic sensor, a radar sensor and an imaging camera;
  the actuator comprises an electric motor;
  at least some of the powered closure doors comprise passenger doors that pivot about a hinge assembly; and
  at least some of the powered closure doors comprises a tailgate.

According to a third aspect of the present disclosure, a method of assisting a vehicle with parking in a garage is provided. The method includes the steps of sensing objects relative to the vehicle with a plurality of sensors located on the vehicle and generating sensed signals indicative of the sensed objects, communicating with a parked vehicle located in the garage, processing the sensed signals generated by the plurality of sensors, and determining a distance and location of the sensed objects relative to a plurality of powered closure doors. The method also includes the steps of determining with a controller a parking location for the vehicle in the garage, wherein the parking location is determined such that the at least some of plurality of powered closure doors are free from contact with an object in the garage when the at least some of the powered closure doors are in an open position, and wherein the parking location is free of contact with powered closure doors on the parked vehicle, and providing an output to assist a driver of the vehicle to park the vehicle in the garage in the determined parking location.

Embodiments of the third aspect of the disclosure can include any one or a combination of the following features:

the vehicle communicates with the parked vehicle via a transceiver to acquire powered door closure data for the parked vehicle; and the vehicle determines the location of features in the garage by processing the sensed signals of the plurality of sensors, and wherein the controller determines the parking location further based on the location of the sensed features of the garage.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
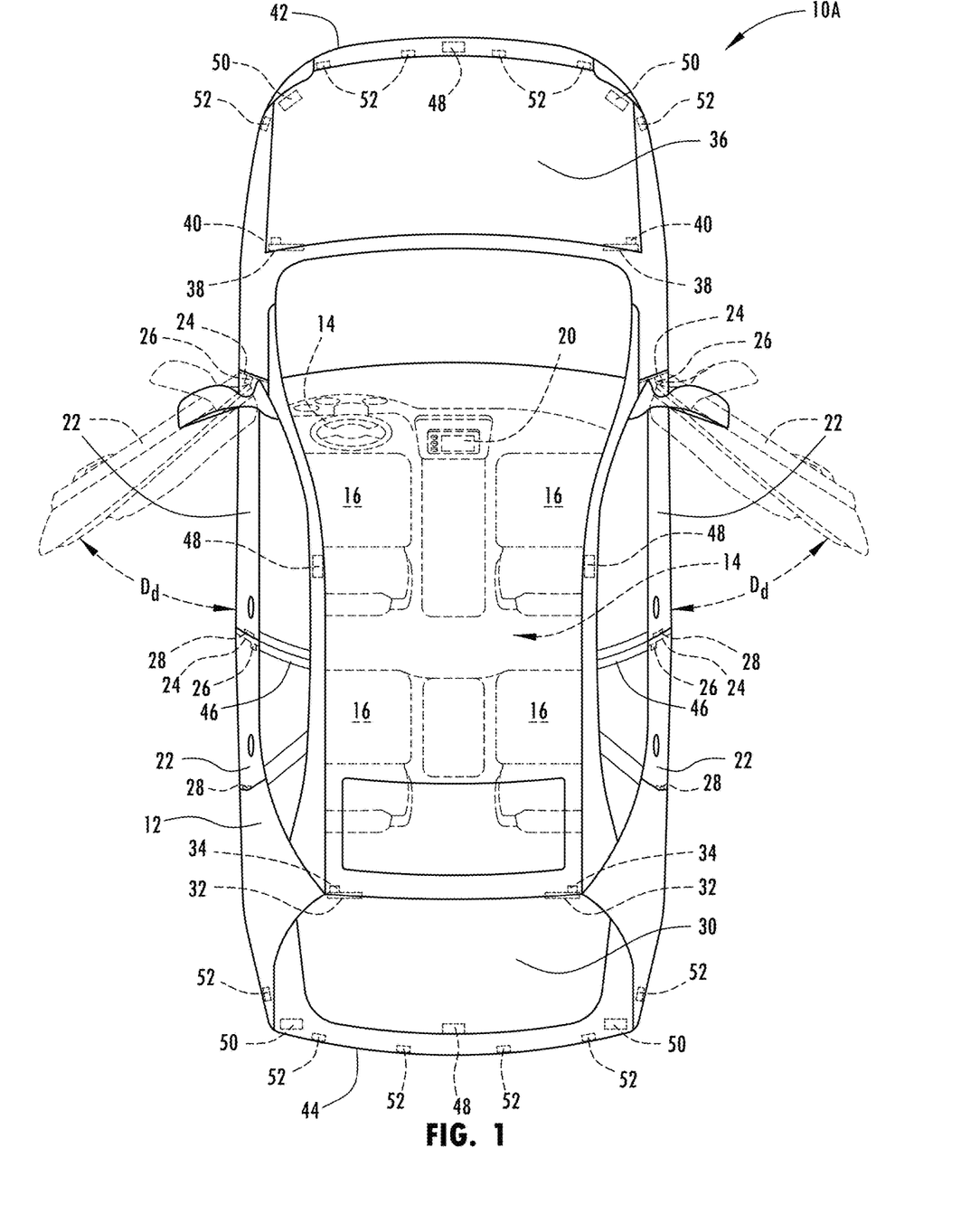
FIG. 1 is a top schematic view of a motor vehicle equipped with park assist, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle park assist system and method for parking a vehicle having powered doors. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10A, also referred to as a first or host vehicle, is generally illustrated having a cabin interior 14 defined by a vehicle body 12 and configured with passenger seating for transporting passengers in the vehicle 10A. The cabin interior 14 is generally defined by the vehicle body 12 and may include various features and trim components within the cabin interior 14. The cabin interior 14 may include an arrangement of passenger seats 16 including a first or front row of driver and passenger seats generally located towards the front of the cabin interior 14 and one or more rows of passenger seats located rearward of the front row of passenger seats. The vehicle 10A may be equipped with a steering wheel 18 located in front of the driver seat to enable the driver to steer the vehicle road wheels. Additionally, one or more human machine interfaces (HMI), such as a touchscreen display 20, audio speakers, microphone, etc., may be provided on the vehicle 10A to communicate driver assistance commands and inputs with the driver and one or more passengers in the vehicle 10A.

The vehicle 10A is equipped with park assist to assist with the parking of the vehicle 10A, particularly to assist the driver with parking of the vehicle 10A, particularly at a parking location within a garage. The vehicle 10A has a plurality of powered closure doors that include two side passenger doors 22 on opposite lateral sides of the vehicle, a rear trunk door 30 at the rear of the vehicle 10A and a front trunk door 36 at the front of the vehicle 10A. Each of the closure doors 22, 30 and 36 may close a space of the cabin interior 14 in the closed position and allow access to the cabin interior 14 in an open position. The door closures 22, 30 and 36 are powered closure doors, each having an actuator, such as a motor, for moving the corresponding door between the closed and open positions. The powered actuators may move the powered doors to the open or closed positions in response to a user input, such as an input entered on a keyfob, a smartphone or other electronic device. Additionally, the powered doors may be opened and closed by the actuators in response to detecting movement or position of a driver approaching or departing the vehicle 10A.

It should be appreciated that the vehicle 10A may include additional rows of seating and closure doors, such as may be found on large SUVs, vans and buses. For example, the vehicle 10A may include four side doors or more. The vehicle 10A may be a motor vehicle, such as a wheeled car, truck, SUV, van or bus, for example, having one or more powered closure doors. Each of the powered closure doors moves relative to the body 12 of the vehicle 10A between a closed position generally flush with the body 12 of the vehicle 10A and an extended position rotated outward from the body 12 and therefore may require space to move between the closed and open door positions. The park assist advantageously assists a driver of the vehicle 10A in maneuvering the vehicle 10A to a parking location such as in a garage, in a manner to provide enough space for the power closures on the vehicle 10A to move between the open and closed positions and for powered closure doors on one or more other vehicles to move between closed and open positions and be accessible.

The vehicle 10A is shown in FIG. 1 having two side closure doors 22. However, the vehicle 10A may have additional side closure doors such as four side closure doors, with two of the side doors 22 located forward and adjacent to the front row of seats 16 and the other two of the side doors 22 located rearward thereof and adjacent to the second or rear row of seats 16. Each of the side doors 22 includes a door panel that pivots about hinges 24 generally along a vertical axis to allow the door 22 to swing outward to an open position or be latched via latch 28 in the closed position. The side doors 22 each includes an actuator such as an electric motor 26 which may be located at or near one of the hinges 24 to power actuate the corresponding closure door 22 between the closed and open positions.

The power closure doors also include the rear or trunk door 30 which controls access to the trunk or rear storage compartment. The rear or trunk door 30 has hinges 32 arranged generally along a horizontal axis to allow the trunk door 30 to move between the downward closed position and the upward open position. An actuator such as an electric motor 34 may be located at or near one of the hinges 32 to actuate the rear door 30 between the open and closed positions. The rear or trunk door 30 may otherwise be configured as a liftgate, a tailgate or a swing gate that pivots about either a horizontal or vertical axis.

The door closures further include the front or frunk door 36 which controls access to a front trunk that may be used as a storage compartment to store items, particularly for an electric vehicle where there is generally more space available for containing items. The frunk door 36 pivots about horizontal hinges 38. An actuator such as an electric motor may be located at or near one of the hinges 38 to power the rear door 36 between the open and closed positions. The rear or frunk door 36 may otherwise be configured as a liftgate or swing gate that pivots about a horizontal or vertical axis.

The powered closure doors may be controlled to open based on a user input to a flush mounted door handle or a keyfob or smartphone, according to one example. In another example, the powered closure doors may automatically open upon detecting a driver or passenger approaching the vehicle such as by processing camera images on the user's biometric attributes (e.g., facial recognition) and/or detecting an electronic device such as a phone or keyfob.

The vehicle 10A is equipped with a plurality of sensors that are located on the vehicle 10A for sensing objects outside of the vehicle 10A and within a space surrounding the vehicle 10A and generating sensed signals indicative of the sensed objects. The plurality of sensors may include a plurality of imaging devices, such as two cameras 48, which are shown located on opposite lateral sides of the vehicle such as near the side doors or in the B-pillars 46, a camera 48 shown in a front fascia 42 of the vehicle 10A and a camera 48 shown in a rear fascia 44 of the vehicle 10A. Each of the cameras 48 may acquire images of the space surrounding the perimeter of the vehicle 10A. The acquired images may be analyzed by video processing to identify the objects and the position of the objects relative to the vehicle 10A.

In addition, radar sensors 50 are shown located at each of the four corners of the vehicle 10A for sensing objects located outside of the vehicle 10A and within the space surrounding the vehicle 10A. The radar sensors 50 transmit radio waves and process their reflections from objects to determine distance to the object and location of the object.

Further, a plurality of ultrasonic sensors 52 are shown located at various locations along the front portion and rear portion of the vehicle 10A. In the example shown, six ultrasonic sensors 52 are shown spaced apart and located at or proximate to the rear fascia 44 and six ultrasonic sensors 52 are shown spaced apart and located at or proximate to the front fascia 42. The ultrasonic sensors 52 transmit ultrasonic signals and calculate distance based on the time it takes the signals to return after reflecting off an object.

As such, the cameras and the radar and ultrasonic sensors may detect the location and size of objects and the distance from the vehicle 10A to the detected objects. The plurality of sensors may be used to detect objects such as nearby vehicles and pedestrians near the vehicle and/or the structure of objects in a garage. It should be appreciated that other sensors may be employed by the vehicle 10A to sense objects relative to the vehicle 10A and generate sensed signals that may be used to identify each object and the distance and location of the sensed object relative to the vehicle 10A for use in assisting with the parking assist of the vehicle 10A.

Figure 2:
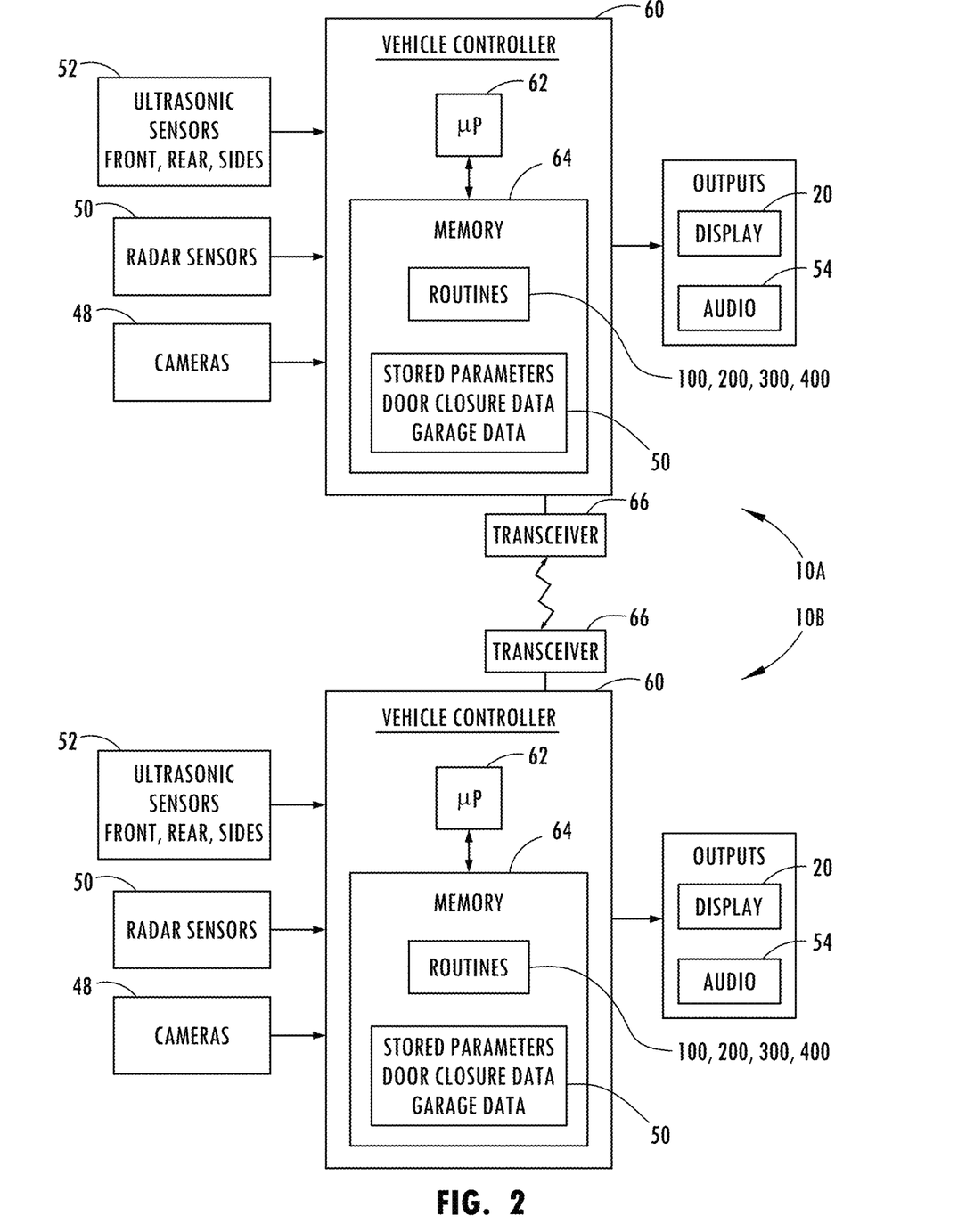
FIG. 2 is a block diagram of the motor vehicle and a parked vehicle configured to communicate for park assist.

Referring to FIG. 2, the vehicle 10A is shown having a vehicle controller 60 and communicating with a vehicle controller 60 on a second or another parked vehicle 10B, also referred to as a second or other vehicle. Each of the vehicle 10A and the parked vehicle 10B may include control circuitry, such as a microprocessor 62 and memory 64. It should be appreciated that each of the vehicle controllers 60 may include analog and/or digital control circuitry. Stored in memory 64 are routines 100, 200, 300, 400 and 500. In addition, various stored parameters 500 may be stored in memory 64. The stored parameters 500 may include door closure data such as dimensions for each closure door on the corresponding vehicle and on other vehicles such as a parked vehicle, including the swing distance extended from the vehicle 10A in the open door position, and garage data including measured data with dimensions of the interior walls and other objects of one or more garages. Each of the vehicle controllers 60 receives inputs from the plurality of sensors located on the corresponding vehicle including the cameras 48, radar sensors 50 and ultrasonic sensors 52. In addition, each of the vehicle controllers 60 are configured to provide outputs to one or more HMIs such as the touchscreen display 20 and audio speakers 54 located on the corresponding vehicle. The controller 60 on vehicle 10A may communicate via a transceiver 66 with a transceiver 66 on the parked vehicle 10B and may communicate with one or more further vehicles. The communication may be wireless communication such as via RF signals employed by Bluetooth®, Ultra Wide-Band (UWB) WiFi, cellular data, vehicle-to-vehicle (V2V) communication in the ultra wideband, or other forms of wireless communication. For example, the vehicle 10A controller 60 may communicate with the parked vehicle 10B to obtain door closure dimension data for the parked vehicle 10B and sensed garage dimension data for use in assisting with the parking of the vehicle 10A in the corresponding garage.

Figure 3A:
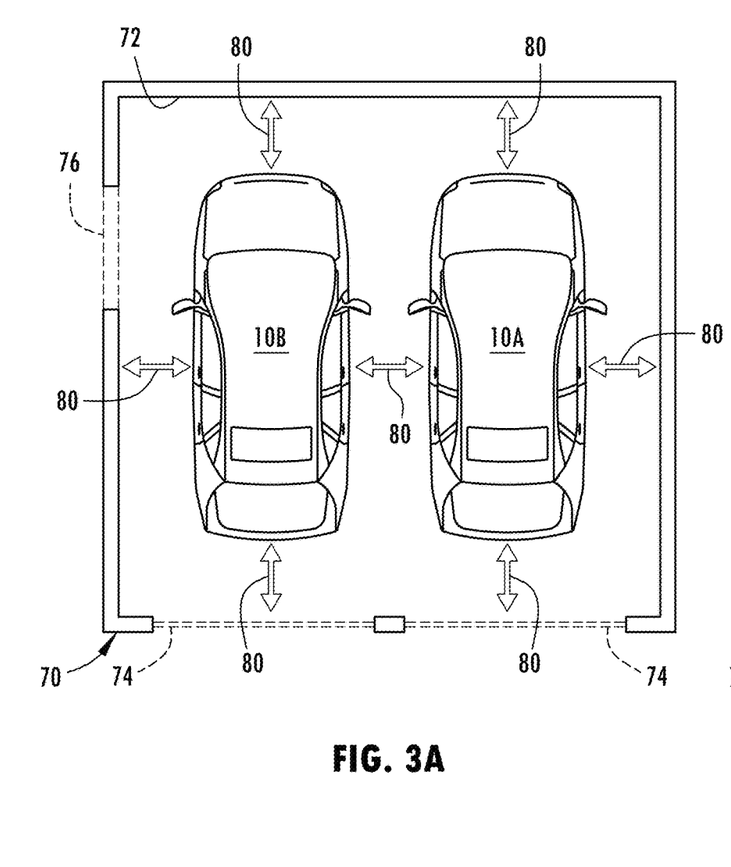
FIG. 3A is a displayed view of a pair of vehicles parked in a parking garage, according to a first configuration.
Figure 3B:
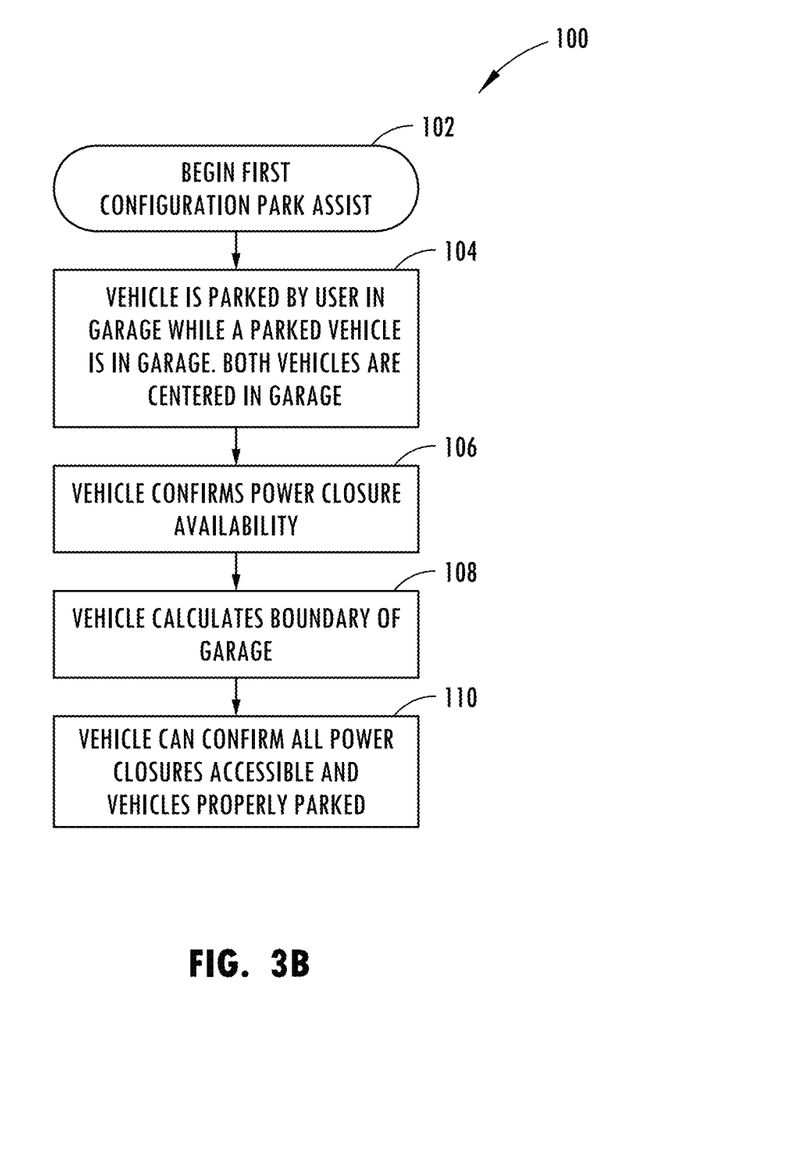
FIG. 3B is a flow diagram illustrating a routine for assisting with parking of the host vehicle in the garage, according to the first configuration shown in FIG. 3A.

A first configuration of a parking scenario for parking assist for parking the vehicle 10A in a garage 70 is illustrated in FIGS. 3A and 3B. In FIG. 3A, the garage 70 is generally shown configured as a two-car garage with a pair of garage doors 74 for parking two motor vehicles, side-by-side, as shown. However, the garage 70 may otherwise be configured to park more vehicles in various parking configurations. The garage 70 includes walls 72, such as four walls that generally define a rectangular shape of the garage in one example. In addition, the garage 70 may include one or more side doors 76 for access to the garage 70, such as access from a house or from the outside of the garage 70. In the first configuration, the vehicle 10A and a parked vehicle 10B are shown properly parked side-by-side in the garage 70, with each vehicle having power closure doors that can be operated between the open and closed positions without interference from the adjacent vehicle or from the garage walls or other objects in the garage 70. When parking the vehicle 10A in the garage next to the parked vehicle 10B, the park assist may provide a map displayed on the touchscreen display 20 with commands and/or provide audible commands via one or more speakers 54 to show where to park the vehicle 10A and whether the vehicle 10A is properly parked in a location within the garage that does not interfere with the walls of the garage or the closure doors of the adjacent parked vehicle 10B. According to one example, symbols in the form of arrow indicators 80 are displayed on the display 20 indicating that there is adequate space between the vehicle 10A and the parked vehicle 10B and between the vehicle 10A and the interior walls of the garage 70.

The park assist may be executed by the method 100 shown in FIG. 3B for the first configuration. Method 100 begins at step 102 and proceeds to step 104 with the vehicle parked by a user in the garage while a parked vehicle is in the garage spaced side-by-side with the vehicle. Both vehicles are shown in FIG. 3A generally centered in the garage in this configuration. Next, at step 106, method 100 proceeds to step 106 where the vehicle confirms power closure door availability on the vehicle and the parked vehicle. Power closure doors of both vehicles include the side passenger doors, the trunk door and the frunk door. It is assumed that the vehicle is aware of the power closure doors on the parked vehicle and the distance required to open each power closure door is known and stored in memory. Next, at step 108, method 100 calculates the boundary dimensions of the interior of the garage 70. This may be achieved by employing the plurality of sensors including the cameras, radar sensors, and ultrasonic sensors to sense objects and distances to the objects located around the vehicle and to map out the objects that define the interior boundaries of the garage. It should be appreciated that once the interior boundaries of the garage are sensed and the distances are calculated by the vehicle or the parked vehicle, the interior boundaries of the garage may be stored in memory and used for park assist in the future. Finally, at step 110, the vehicle can confirm all power closure doors are accessible and the vehicle is properly parked in the garage. This confirmation may be displayed to a user on the touchscreen display 20 and/or via audible instructions via the one or more audio speakers 54.

Figure 4A:
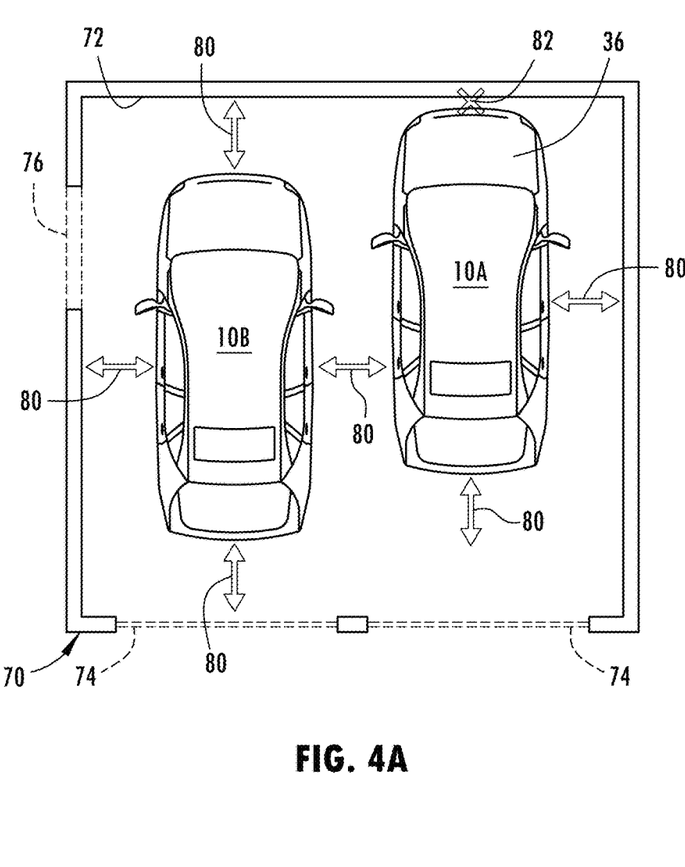
FIG. 4A is a displayed view of the vehicle and a parked vehicle in a garage in a second configuration.

Referring to FIG. 4A, the vehicle 10A and a parked vehicle 10B are shown located in a garage 70 with the vehicle 10A shown located close to a wall of the garage at the front of the vehicle 10A. In this second configuration, the vehicle 10A is positioned too close to the wall to allow easy access to the frunk via the frunk door 36 on the vehicle 10A. In this situation, the driver of vehicle 10A may be notified with visual or audible commands to move the vehicle 10A rearward to a position that will allow adequate access to the closure doors. The driver may decide not to move the vehicle 10A, knowing that the door access is limited.

Figure 4B:
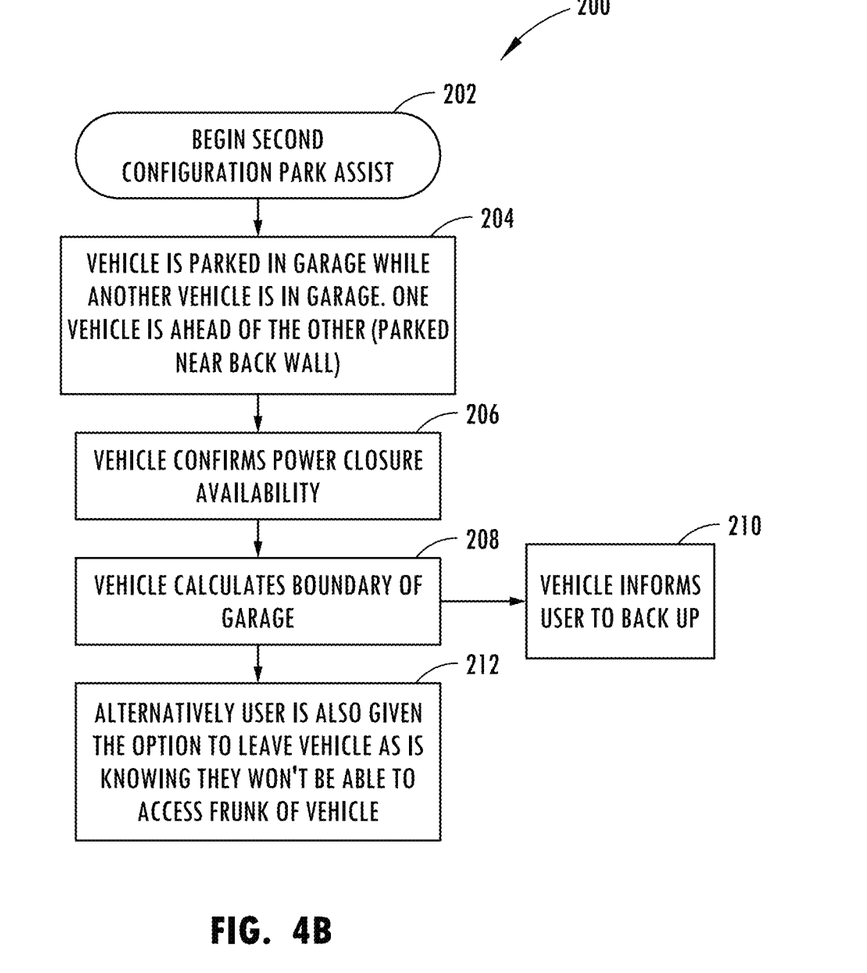
FIG. 4B is a flow diagram illustrating a method of assisting with parking the vehicle in the garage, according to the second configuration.

The park assist for the second configuration may be executed by method 200 illustrated in FIG. 4B. Method 200 begins at step 202 and proceeds to step 204 where the vehicle is parked in the garage while another parked vehicle is in the garage. Vehicle 10A is shown in FIG. 4A ahead of the parked vehicle 10B near the back wall of the garage. Method 200 will proceed to step 206 where the vehicle will confirm power closure availability. Next, at step 208, method 200 will sense and calculate the interior boundary dimensions of the garage or use stored interior boundary dimensions of the garage. The vehicle will generate an output to inform a user to back up the vehicle at step 210 when the vehicle is determined to be located too close to the boundary wall of the garage to allow adequate access to one or more of the closure doors. It should be appreciated that the vehicle calculates if there is enough space for the user to access the closure doors and may inform the user to back up the vehicle via the touchscreen display 20, an audible alert on a sound exciter, and/or other HMI. Alternately, at step 212, method 200 may give the user an option to leave the vehicle in the current location, knowing that the operator will not be able to properly access the frunk door or other closure door(s) of the vehicle.

Figure 5A:
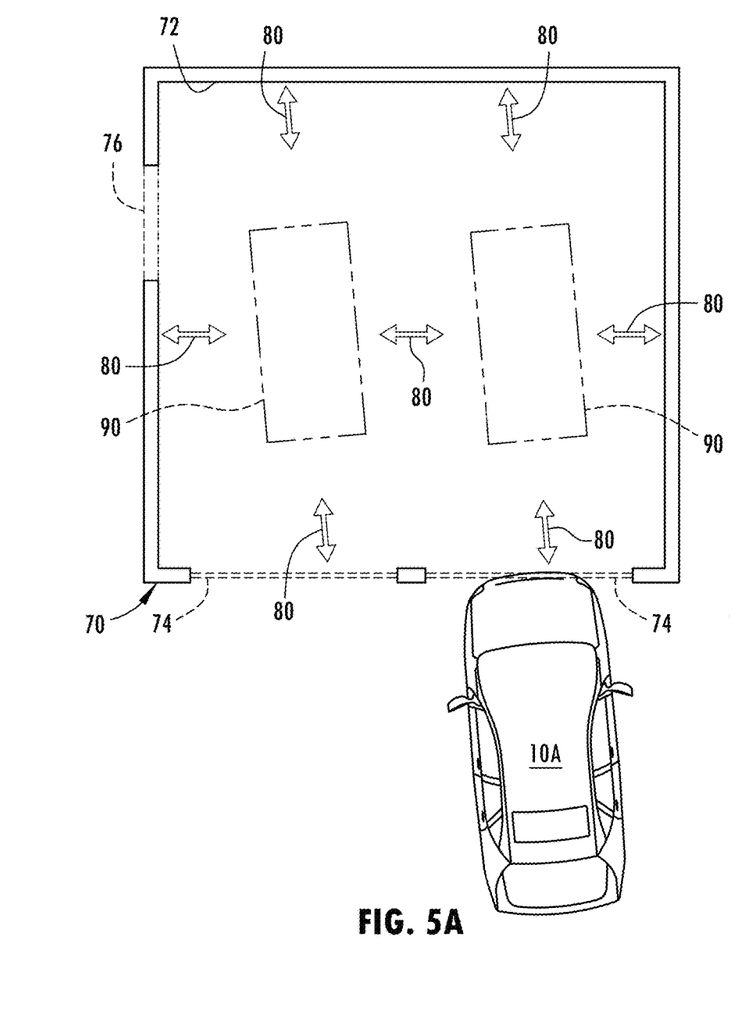
FIG. 5A is a displayed view of the vehicle entering a parking garage, according to a third configuration.
Figure 5B:
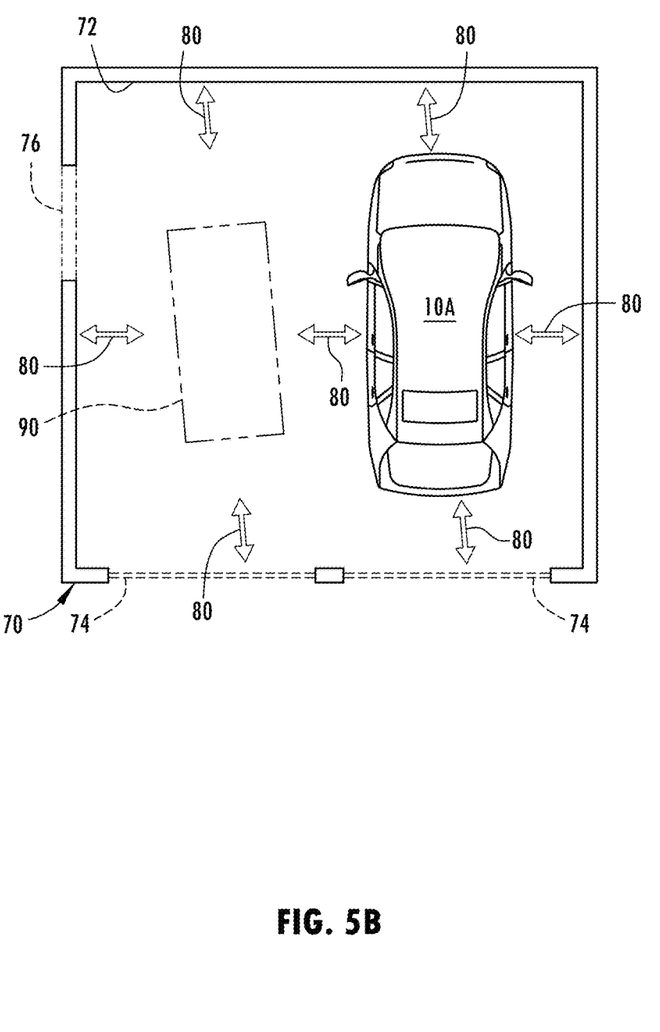
FIG. 5B is a displayed view of the vehicle parked in the garage, according to the third configuration.

Referring to FIGS. 5A and 5B, a third configuration of a parking scenario for park assist for parking the vehicle 10A in a garage is illustrated. In FIG. 5A, the vehicle 10A is generally illustrated approaching and entering the garage. In doing so, the vehicle 10A senses objects with the sensors and processes the sensed signals to calculate the interior dimensions of the garage and displays a map to assist the driver with a parking location shown by lines 90 on the touchscreen display to show where the vehicle is recommended to be parked. As seen in FIG. 5B, the vehicle 10A is fully located and parked within the garage at the recommended parking location 90 with arrow indicators 80 indicating that the host vehicle 10A has sufficient room relative to the garage dimensions to operate the powered closure doors between the open and closed positions and to access the door opening.

Figure 5C:
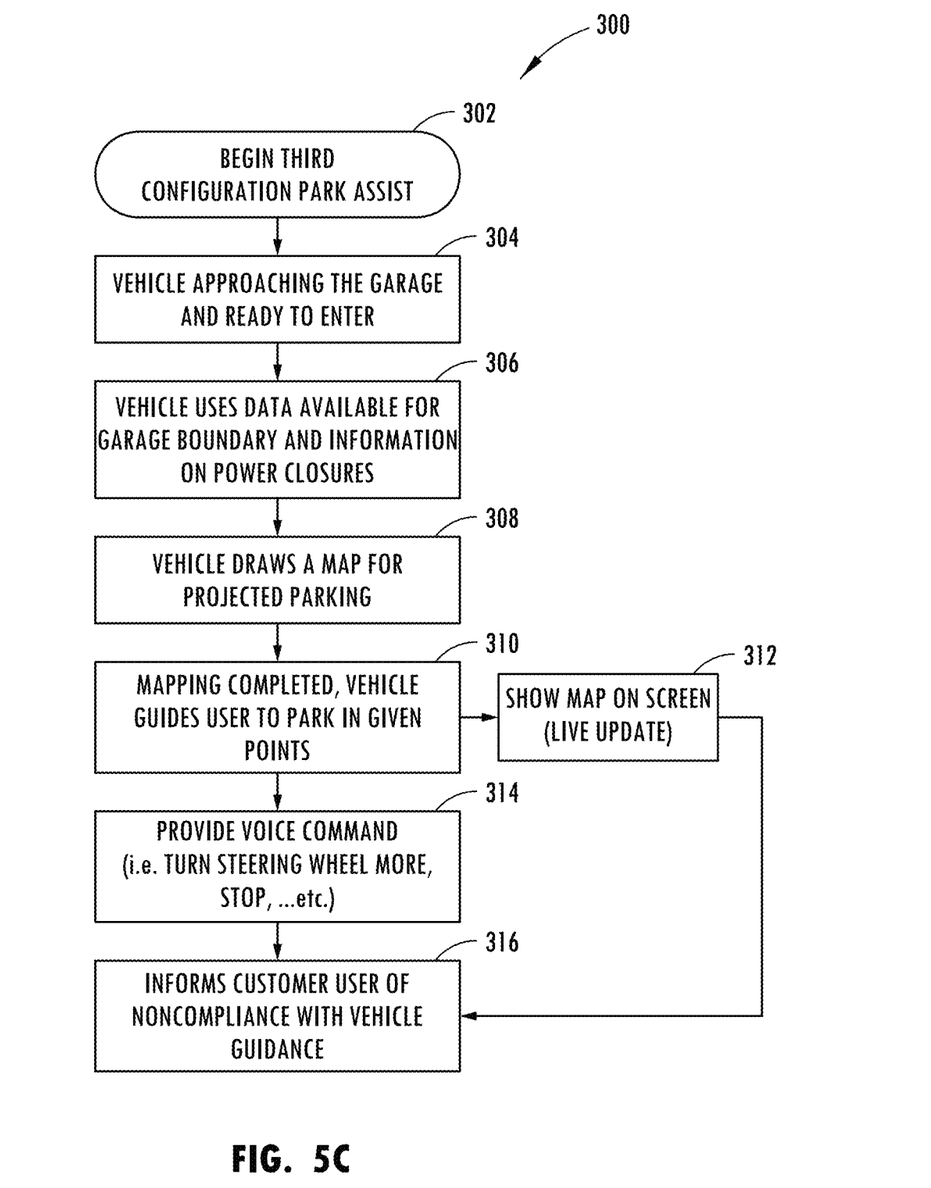
FIG. 5C is a flow diagram illustrating a method of assisting with parking the vehicle in the garage, according to the third configuration.

The park assist may be executed by method 300 shown in FIG. 5C for the second configuration. Method 300 begins at step 302 and proceeds to step 304 to determine that the vehicle is approaching the garage and ready to enter the garage. Next, at step 306, the vehicle uses data available for the garage boundary dimensions and information on the vehicle power closure doors opening dimensions. Next, at step 308, the vehicle presents a map on the display showing the projected parking location within the garage that allows access to the vehicle closure doors without obstruction by an object, such as the garage walls. Next, at step 310, with the mapping completed, the vehicle assists a user to park the vehicle at a given parking location by providing commands such as indicators on a display or audible instructions. At step 312, the map is displayed on the screen display with live updates as the vehicle proceeds. Proceeding to step 314, method 300 may provide voice commands such as instructions to turn the vehicle steering wheel right or left, stop, etc. for the user to follow the instructions to park the vehicle at the parking location. Finally, the step 316, method 300 informs the user of any determined non-compliance with vehicle guidance.

Figure 6A:
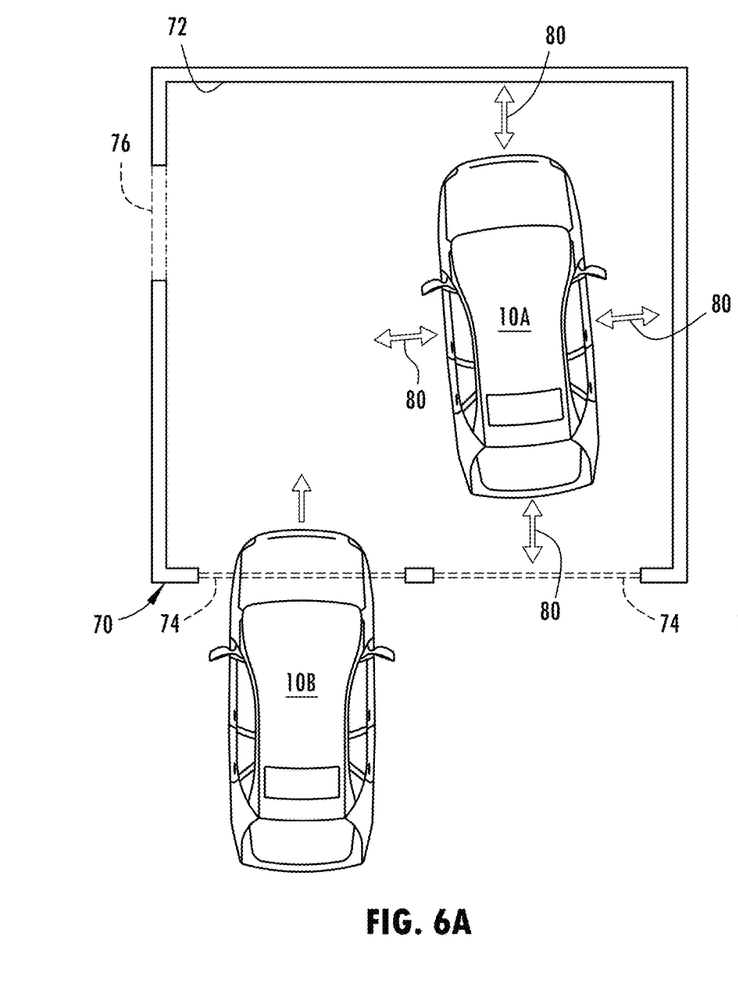
FIG. 6A is a displayed view of the vehicle entering a garage containing a parked vehicle, according to a fourth configuration.
Figure 6B:
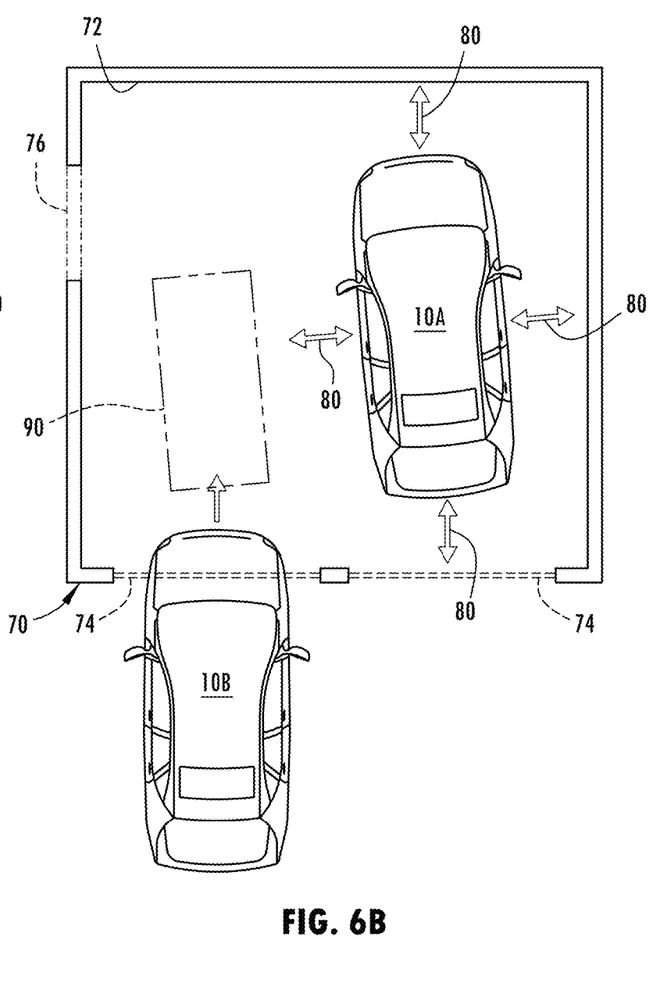
FIG. 6B is a displayed view of the vehicle entering the garage and displaying an instructed parking location, according to the fourth configuration.
Figure 6C:
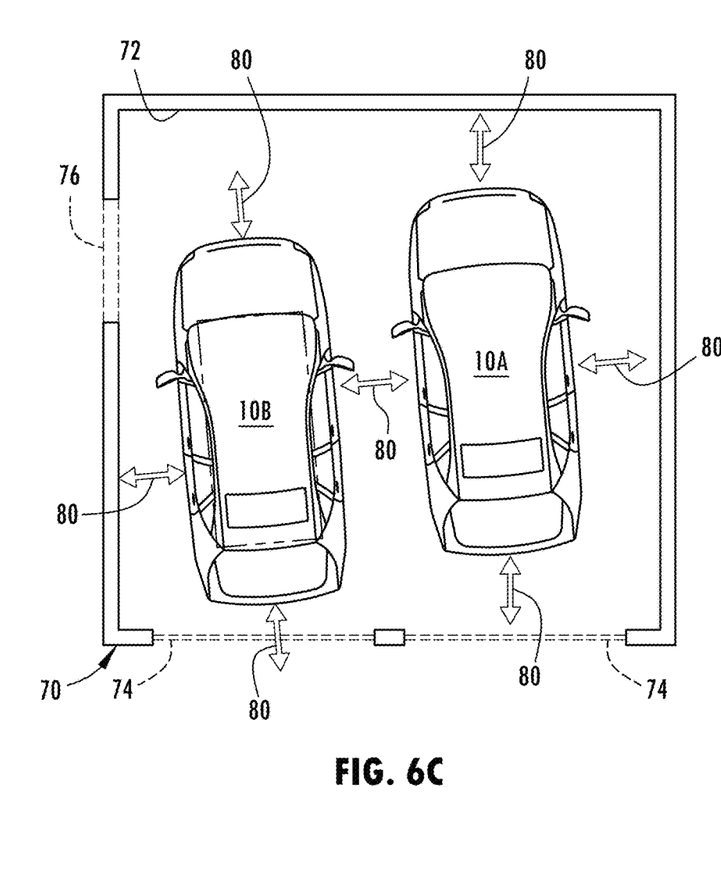
FIG. 6C is a displayed view of the vehicle parked in the garage adjacent to the parked vehicle, according to the fourth configuration.
Figure 6D:
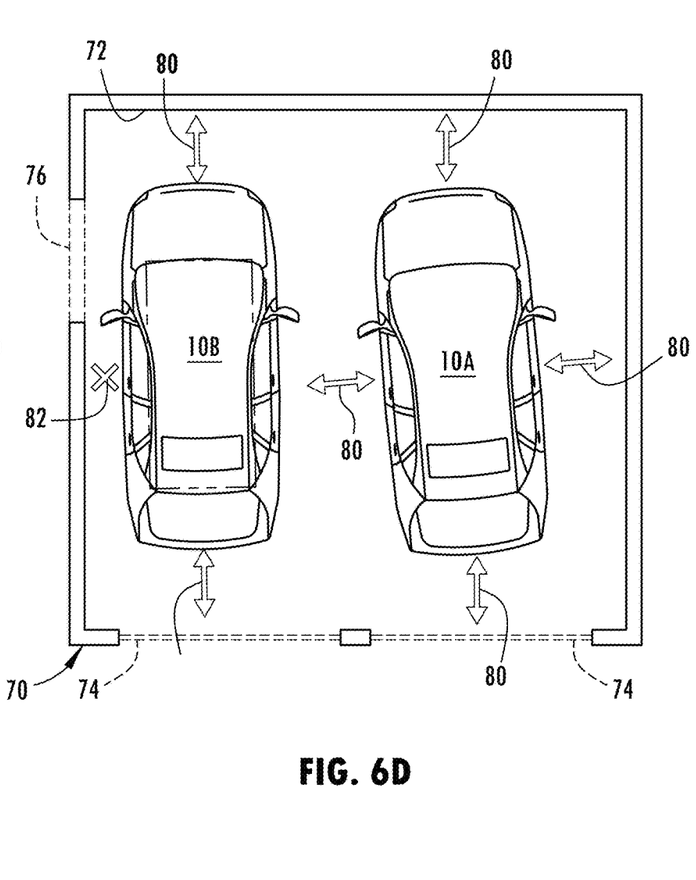
FIG. 6D is a displayed view of the vehicle parked adjacent to the parked vehicle in the garage and displaying a warning that the vehicle is too close to a wall, according to the fourth configuration.

A fourth configuration of a parking scenario for parking assist for parking the vehicle 10A in a garage 70 is illustrated in FIGS. 6A-6E. In FIG. 6A, another parked vehicle 10B is parked within the garage 70 and oriented at an angle relative to the side walls of the garage, such that the parked vehicle 10B is not aligned with the side walls but is parked at an angle in the garage. The vehicle 10A is shown approaching the garage 70 as it moves forward. In FIG. 6B, the vehicle 10A generates a map on the display with parking lines 90 that designate a parking location and the orientation of the vehicle 10A to park adjacent to the parked vehicle 10B in a manner that does not interfere with the operation of the power closure doors of either vehicle. Referring to FIG. 6C, the vehicle 10A is shown fully positioned within the recommended parking location of the garage in a manner that allows sufficient access to the power closure doors as indicated by double arrowed indicators 80. In FIG. 6D, the vehicle 10B is shown parked too close to one wall of the garage 70 such that one or more power closure doors on the vehicle 10A may not fully open without contact to the one wall. In this situation, the vehicle 10A provides a warning indicator 82 to warn the driver of the vehicle 10A that one or more vehicle closure doors may not be fully accessible. The driver may then attempt to reposition the vehicle 10A or may attempt to park the vehicle 10A in that location knowing that one or more closure doors may not be fully operable or accessible.

Figure 6E:
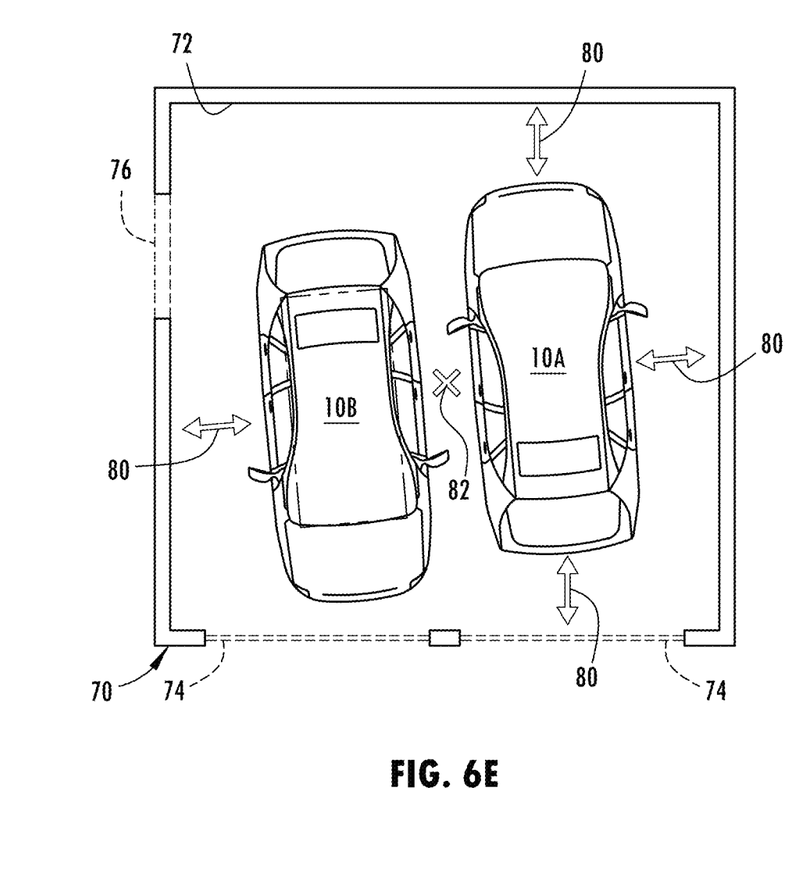
FIG. 6E is a displayed view of the vehicle and a displayed warning that the vehicle is parked too close to the parked vehicle in the garage, according to the fourth configuration.

In FIG. 6E, the vehicle 10A is shown parked too close to the other vehicle 10B such that one or more vehicle closure doors may not be fully accessible and such that the one or more vehicle closure doors of the other vehicle may not be accessible. The driver may then reposition the vehicle 10A or may park the vehicle at that location knowing that certain one or more vehicle closure doors may not be fully accessible.

Figure 6F:
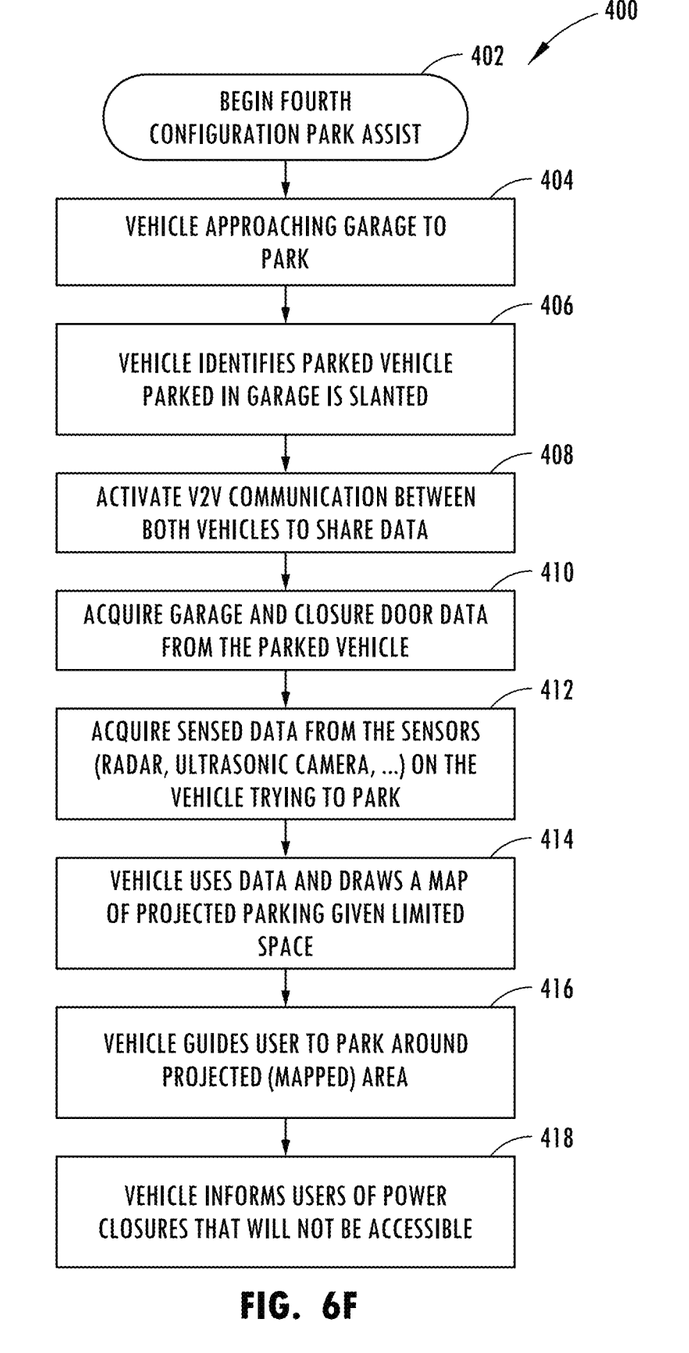
FIG. 6F is a flow diagram illustrating a method of assisting with parking of the vehicle in the garage, according to the fourth configuration.

The vehicle park assist may be executed with the use of the method 400 shown in FIG. 6F for the fourth configuration. Method 400 begins at step 402 and proceeds to step 404 with the vehicle approaching the garage to park the vehicle in the garage. Next, at step 406, the vehicle identifies a parked vehicle parked in the garage at a slanted angle relative to the side walls of the garage. At step 408, the vehicle may communicate with the other parked vehicle using active vehicle-to-vehicle (V2V) wireless communication to share data between the vehicles, such as dimensions of the garage interior boundaries and closure door opening size dimension data. At step 410, garage and closure door data is acquired from the other parked vehicle that is parked in the garage and from the sensors on the vehicle that is attempting to park in the garage. At step 412, method 400 acquires sensed data from the sensors on the vehicle that is trying to park. At step 414, the vehicle uses the data gathered and draws a map on the display showing the projected parking location given the limited space available in the garage. At step 416, the vehicle assists or guides the user to park around the projected mapped area at a location that allows access to the vehicle closure doors of both vehicles. Finally, at step 418, the vehicle informs the user of the powered closure doors that will not be accessible.

Accordingly, the vehicle 10 advantageously employs park assist to assist in parking the vehicle 10A at a location within a garage 70 in a manner that does not interfere with the operation of one or more powered closure doors of the vehicle 10A and of one or more other parked vehicles 10B parked within the garage 70. This advantageously allows for a vehicle operator to access the vehicle 10A via the powered closure doors without interference from one or more objects.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle having park assist, the vehicle comprising:
a plurality of powered closure doors, each door having an actuator for moving the door between closed and open positions;
a plurality of sensors located on the vehicle for sensing objects relative to the vehicle and generating sensed signals indicative of the sensed objects;
a transceiver for communicating with a parked vehicle;
a controller processing the sensed signals generated by the plurality of sensors, determining a distance and location of the sensed objects relative to the plurality of powered closure doors, and determining a parking location for the vehicle, wherein the parking location is determined such that the at least some of the plurality of powered closure doors are free from contact with an object when the at least some of the closure doors are in an open position, and wherein the controller determines the parking location to be free of contact with powered closure doors on the parked vehicle when the vehicle is parked parallel and adjacent with the parked vehicle; and
an output for providing an output to assist a driver of the vehicle to park the vehicle in the determined parking location.

2. The vehicle of claim 1, wherein the vehicle communicates with the parked vehicle via the transceiver to acquire powered door closure data for the parked vehicle.

3. The vehicle of claim 1, wherein the parking location is in a garage.

4. The vehicle of claim 3, wherein the vehicle determines the location of features in the garage by processing the sensed signals of the plurality of sensors, and wherein the controller determines the parking location in the garage further based on the location of the sensed features of the garage.

5. The vehicle of claim 4, wherein the sensed features include walls defining an open space of the garage.

6. The vehicle of claim 1, wherein the plurality of sensors comprises at least one of an ultrasonic sensor, a radar sensor and an imaging camera.

7. The vehicle of claim 1, wherein the controller further determines a location of a user of the vehicle and actuates at least one of the powered closure doors to the open position when the user approaches the vehicle.

8. The vehicle of claim 1, wherein the actuator comprises an electric motor.

9. The vehicle of claim 1, wherein at least some of the powered closure doors comprise passenger doors that pivot about a hinge assembly.

10. The vehicle of claim 9, wherein at least some of the powered closure doors comprises a rear door.

11. A vehicle having park assist, the vehicle comprising:
a plurality of powered closure doors, each door having an actuator for moving the door between closed and open positions;
a plurality of sensors located on the vehicle for sensing objects relative to the vehicle and generating sensed signals indicative of the sensed objects;
a transceiver for communicating with a parked vehicle;
a controller processing the sensed signals generated by the plurality of sensors, determining a distance and location of the sensed objects relative to the plurality of powered closure doors, and determining a parking location for the vehicle in a garage, wherein the parking location is determined such that the at least some of the plurality of powered closure doors are free from contact with an object in the garage when the at least some of the powered closure doors are in an open position, and wherein the controller determines the parking location to be free of contact with powered closure doors on the parked vehicle when the vehicle is parked parallel and adjacent with the parked vehicle; and
an output for providing an output to assist a driver of the vehicle to park the vehicle in the garage in the determined parking location, wherein the vehicle communicates with the parked vehicle via the transceiver to acquire powered door closure data for the parked vehicle.

12. The vehicle of claim 11, wherein the vehicle determines the location of features in the garage by processing the sensed signals of the plurality of sensors, and wherein the controller determines the parking location further based on the location of the sensed features of the garage.

13. The vehicle of claim 12, wherein the sensed features include walls defining an open space of the garage.

14. The vehicle of claim 11, wherein the plurality of sensors comprises at least one of an ultrasonic sensor, a radar sensor and an imaging camera.

15. The vehicle of claim 11, wherein the actuator comprises an electric motor.

16. The vehicle of claim 11, wherein at least some of the powered closure doors comprise passenger doors that pivot about a hinge assembly.

17. The vehicle of claim 16, wherein at least some of the powered closure doors comprises a rear door.

18. A method of assisting a vehicle with parking in a garage, the method comprising:
sensing objects relative to the vehicle with a plurality of sensors located on the vehicle and generating sensed signals indicative of the sensed objects;
communicating with a parked vehicle located in the garage;
processing the sensed signals generated by the plurality of sensors;
determining a distance and location of the sensed objects relative to a plurality of powered closure doors;
determining with a controller a parking location for the vehicle in the garage, wherein the parking location is determined such that the at least some of plurality of powered closure doors are free from contact with an object in the garage when the at least some of the powered closure doors are in an open position, and wherein the parking location is free of contact with powered closure doors on the parked vehicle when the vehicle is parked parallel and adjacent with the parked vehicle; and
providing an output to assist a driver of the vehicle to park the vehicle in the garage in the determined parking location.

19. The method of claim 18, wherein the vehicle communicates with the parked vehicle via a transceiver to acquire powered door closure data for the parked vehicle.

20. The method of claim 18, wherein the vehicle determines the location of features in the garage by processing the sensed signals of the plurality of sensors, and wherein the controller determines the parking location further based on the location of the sensed features of the garage.

* * * * *